United States Patent
Emura et al.

(10) Patent No.: US 9,334,018 B2
(45) Date of Patent: May 10, 2016

(54) BICYCLE DERAILLEUR

(71) Applicant: Shimano Inc., Sakai, Osaka (JP)

(72) Inventors: Atsuhiro Emura, Osaka (JP); Kenkichi Inoue, Osaka (JP); Kazuya Kuwayama, Osaka (JP)

(73) Assignee: Shimano Inc., Osaka (JP)

( * ) Notice: Subject to any disclaimer, the term of this patent is extended or adjusted under 35 U.S.C. 154(b) by 77 days.

(21) Appl. No.: 14/444,159

(22) Filed: Jul. 28, 2014

(65) Prior Publication Data

US 2016/0023714 A1    Jan. 28, 2016

(51) Int. Cl.
| | |
|---|---|
| F16H 9/00 | (2006.01) |
| F16H 59/00 | (2006.01) |
| F16H 61/00 | (2006.01) |
| F16H 63/00 | (2006.01) |
| B62M 9/1342 | (2010.01) |
| B62M 9/136 | (2010.01) |
| B62M 9/135 | (2010.01) |

(52) U.S. Cl.
CPC ............. *B62M 9/1342* (2013.01); *B62M 9/135* (2013.01); *B62M 9/136* (2013.01)

(58) Field of Classification Search
CPC .. B62M 8/1342; B62M 9/136; B62M 9/1244; B62M 9/1248; B62M 9/127
USPC ..................................................... 474/80, 82
See application file for complete search history.

(56) References Cited

U.S. PATENT DOCUMENTS

| | | | | | |
|---|---|---|---|---|---|
| 3,181,383 | A | * | 5/1965 | Juy ....................... | B62M 9/1242 280/261 |
| 3,702,080 | A | * | 11/1972 | Huret .................... | B62M 9/126 474/134 |
| 3,927,904 | A | * | 12/1975 | Bergles ................ | B62M 9/1242 280/236 |
| 3,974,707 | A | * | 8/1976 | Nagano ................ | B62M 9/1244 280/236 |
| 4,027,542 | A | * | 6/1977 | Nagano ................. | B62M 9/126 474/82 |
| 4,030,375 | A | * | 6/1977 | Nagano ................ | B62M 9/1246 474/82 |
| 4,106,356 | A | * | 8/1978 | Nagano ................ | B62M 9/1248 474/82 |
| 4,198,873 | A | * | 4/1980 | Nagano ................ | B62M 9/1244 474/82 |
| 4,229,987 | A | * | 10/1980 | Fujimoto ............... | B62M 9/127 280/236 |

(Continued)

*Primary Examiner* — Henry Liu
(74) *Attorney, Agent, or Firm* — Global IP Counselors

(57) ABSTRACT

A bicycle derailleur has a base member, a movable member, a first link member and a second link member. The movable member is movable with respect to the base member between a retracted position and an extended position. The first link member includes a first connecting portion pivotally coupled to the movable member about a first pivot axis. The first link member is pivotally coupled to the base member about a second pivot axis. The second link member is pivotally coupled to the movable member about a third pivot axis. The second link member is pivotally coupled to the base member about a fourth pivot axis. The first connecting portion at least partially overlaps with the second link member as viewed in a direction parallel to the first pivot axis in a state in which the movable member is disposed at one of the retracted and extended positions.

18 Claims, 8 Drawing Sheets

(56) References Cited

U.S. PATENT DOCUMENTS

| | | | | |
|---|---|---|---|---|
| 4,237,743 A * | 12/1980 | Nagano | B62M 9/1342 | 474/140 |
| 4,241,617 A * | 12/1980 | Nagano | B62M 9/1248 | 474/82 |
| 4,259,873 A * | 4/1981 | Nagano | B62M 9/1248 | 474/82 |
| 4,279,605 A * | 7/1981 | Egami | B62M 9/135 | 474/82 |
| 4,424,048 A * | 1/1984 | Shimano | B62M 9/137 | 474/82 |
| 4,543,078 A * | 9/1985 | Coue | B62M 9/1342 | 474/82 |
| 5,037,355 A * | 8/1991 | Kobayashi | B62M 9/1342 | 474/82 |
| 5,104,358 A | 4/1992 | Kobayashi | | |
| 5,389,043 A * | 2/1995 | Hsu | B62M 9/1348 | 474/80 |
| 5,425,678 A * | 6/1995 | Richardson | B62M 9/1342 | 280/261 |
| 5,496,222 A * | 3/1996 | Kojima | B62M 9/1342 | 474/80 |
| 5,533,937 A * | 7/1996 | Patterson | B62M 9/125 | 474/80 |
| 5,620,384 A * | 4/1997 | Kojima | B62M 9/1342 | 474/123 |
| 5,624,336 A * | 4/1997 | Kojima | B62M 9/1342 | 474/82 |
| 5,860,880 A * | 1/1999 | Oka | B62M 9/1242 | 474/77 |
| 6,471,610 B1 * | 10/2002 | Tseng | B62M 9/1342 | 474/80 |
| 6,868,752 B2 * | 3/2005 | Tetsuka | B62M 25/02 | 474/80 |
| 7,014,584 B2 | 3/2006 | Nanko et al. | | |
| 7,651,424 B2 | 1/2010 | Yamamoto et al. | | |
| 7,677,998 B2 * | 3/2010 | Tetsuka | B62M 9/1342 | 474/80 |
| 7,914,407 B2 * | 3/2011 | Fukushima | B62M 9/1342 | 474/80 |
| 8,678,962 B2 * | 3/2014 | Jordan | B62M 9/131 | 29/428 |
| 9,156,524 B2 | 10/2015 | Emura et al. | | |
| 2003/0083161 A1 | 5/2003 | Ozaki | | |
| 2008/0026889 A1 * | 1/2008 | Chiang | B62M 9/1342 | 474/80 |
| 2008/0300076 A1 * | 12/2008 | Fukushima | B62M 9/1342 | 474/80 |
| 2014/0349793 A1 | 11/2014 | Emura et al. | | |

* cited by examiner

BICYCLE DERAILLEUR

BACKGROUND

1. Field of the Invention

This invention generally relates to a bicycle derailleur. More specifically, the present invention relates to a bicycle derailleur having a movable member that is movable with respect to a base member between a retracted position and an extended position.

2. Background Information

Many bicycles are provided with a drivetrain that allows the rider to changing a gear ratio for transferring power from the pedals to the rear wheel. Often the drivetrain uses one or more derailleurs to change the gear ratio. A front derailleur is mounted to the bicycle frame adjacent to front chain rings to shift a chain laterally between the front chain rings, while a rear derailleur is mounted adjacent to a hub of the rear wheel to shift the chain laterally between rear sprockets. In either case, the derailleur typically includes a fixed or base member that is non-movably secured to the bicycle frame, and a movable member. The movable member typically includes a chain guide that is movably supported relative to the base member to move between at least two lateral shift positions. Typically, a linkage assembly is coupled between the fixed member and the movable member in order to movably support the movable member with the chain guide. The derailleur is typically operated by an operation cable that is coupled between a shifter and the derailleur.

SUMMARY

Generally, the present disclosure is directed to various features of a bicycle derailleur. One object of the present invention is to provide a bicycle derailleur that is more compact.

In view of the state of the known technology and in accordance with a first aspect of the present disclosure, a bicycle derailleur is provided that basically comprises a base member, a movable member, a first link member and a second link member. The base member is configured to be attached to the bicycle. The movable member is configured to be movable with respect to the base member between a retracted position and an extended position at which the movable member is farther from the base member than the retracted position. The first link member includes a first connecting portion pivotally coupled to the movable member about a first pivot axis. The first link member is pivotally coupled to the base member about a second pivot axis. The second link member is pivotally coupled to the movable member about a third pivot axis. The second link member is pivotally coupled to the base member about a fourth pivot axis. The first connecting portion at least partially overlaps with the second link member as viewed in a direction parallel to the first pivot axis in a state in which the movable member is disposed at one of the retracted position and the extended position.

In accordance with a second aspect of the present invention, the bicycle derailleur according to the first aspect is configured so that the first, second, third and fourth pivot axes are configured to be arranged relative to the base member such that the first and third pivot axes in the retracted position are offset from the first and third pivot axes in the extended position in a forward and rear direction with respect to a bicycle.

In accordance with a third aspect of the present invention, the bicycle derailleur according to the first aspect is configured so that the first link member is an outer link and the second link member is an inner link.

In accordance with a fourth aspect of the present invention, the bicycle derailleur according to the third aspect is configured so that the second link member includes a support projection extending outwardly and a cable attachment structure being disposed on the support projection adjacent the first link member.

In accordance with a fifth aspect of the present invention, the bicycle derailleur according to the first aspect is configured so that the second link member includes a second connecting portion that pivotally couples to the base member about the fourth pivot axis, and the first connecting portion at least partially overlapping with the second connecting portion as viewed in the direction parallel to the first pivot axis in the state in which the movable member is disposed at one of the retracted position and the extended position.

In accordance with a sixth aspect of the present invention, the bicycle derailleur according to the first aspect is configured so that the second link member includes a space that receives the first connecting portion of the first link member.

In accordance with a seventh aspect of the present invention, the bicycle derailleur according to the fifth aspect is configured so that the second link member includes a space that receives the first connecting portion of the first link member.

In accordance with an eighth aspect of the present invention, the bicycle derailleur according to the seventh aspect is configured so that the second connecting portion includes a first connecting part attached to the base member and a second connecting part attached to the base member, the space being located between the first and second connecting parts.

In accordance with a ninth aspect of the present invention, the bicycle derailleur according to the eighth aspect is configured so that the first connecting part is attached to the base member by a first pivot shaft, and the second connecting part is attached to the base member by a second pivot shaft.

In accordance with a tenth aspect of the present invention, the bicycle derailleur according to the fifth aspect is configured so that the second connecting portion includes a first connecting part attached to the base member and a second connecting part attached to the base member, and the first connecting portion is disposed between the first connecting part and the second connecting part as viewed in a direction perpendicular to the first pivot axis.

In accordance with an eleventh aspect of the present invention, the bicycle derailleur according to the first aspect is configured so that the first connecting portion protrudes toward the second link member.

In accordance with a twelfth aspect of the present invention, the bicycle derailleur according to the first aspect further comprises a third link member pivotally coupled to the movable member about a fifth pivot axis and pivotally coupled to the base member about a sixth pivot axis.

In accordance with a thirteenth aspect of the present invention, the bicycle derailleur according to the twelfth aspect is configured so that the third link member is disposed farther from the second link member than the first link member.

In accordance with a fourteenth aspect of the present invention, the bicycle derailleur according to the thirteenth aspect is configured so that the third link member has an effective length that is equal to an effective length of the second link member. The effective length of the third link member is measured between the fifth and sixth pivot axes, while the effective length of the second link member is measured between the third and fourth pivot axes.

In accordance with a fifteenth aspect of the present invention, the bicycle derailleur according to the thirteenth aspect is configured so that the second link member includes a support projection extending outwardly and a cable attachment structure being disposed on the support projection adjacent the third link member.

In accordance with a sixteenth aspect of the present invention, a bicycle derailleur is provided that basically comprises a base member, a movable member, and a first link member and a second link member. The base member is configured to be attached to the bicycle. The movable member includes an inner plate and an outer plate configured to form a chain guiding slot therebetween. The movable member being configured to be movable with respect to the base member between a retracted position and an extended position at which the movable member is farther from the base member than the retracted position. The first link member includes a first connecting portion pivotally coupled to the movable member about a first pivot axis. The first link member is pivotally coupled to the base member about a second pivot axis. The second link member includes a third connecting portion pivotally coupled to the movable member about a third pivot axis. The second link member being pivotally coupled to the base member about a fourth pivot axis. The first connecting portion and the third connecting portion are disposed between the base member and an outer surface of the inner plate.

In accordance with a seventeenth aspect of the present invention, the bicycle derailleur according to the sixteenth aspect is configured so that the first, second, third and fourth pivot axes are configured to be arranged relative to the base member such that the first and third pivot axes in the retracted position are offset from the first and third pivot axes in the extended position in a forward and rear direction with respect to a bicycle.

In accordance with an eighteenth aspect of the present invention, a bicycle derailleur is provided that basically comprises a base member, a movable member, and a first link member, a second link member and a third link member. The base member configured to be attached to the bicycle. The movable member is configured to be movable with respect to the base member between a retracted position and an extended position at which the movable member is farther from the base member than the retracted position. The first link member includes a first connecting portion pivotally coupled to the movable member about a first pivot axis. The first link member is pivotally coupled to the base member about a second pivot axis. The second link member is pivotally coupled to the movable member about a third pivot axis. The second link member is pivotally coupled to the base member about a fourth pivot axis. The third link member is pivotally coupled to the movable member about a fifth pivot axis and pivotally coupled to the base member about a sixth pivot axis.

Also other objects, features, aspects and advantages of the disclosed bicycle derailleur will become apparent to those skilled in the art from the following detailed description, which, taken in conjunction with the annexed drawings, discloses one embodiment of the bicycle derailleur.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

Figure 1:
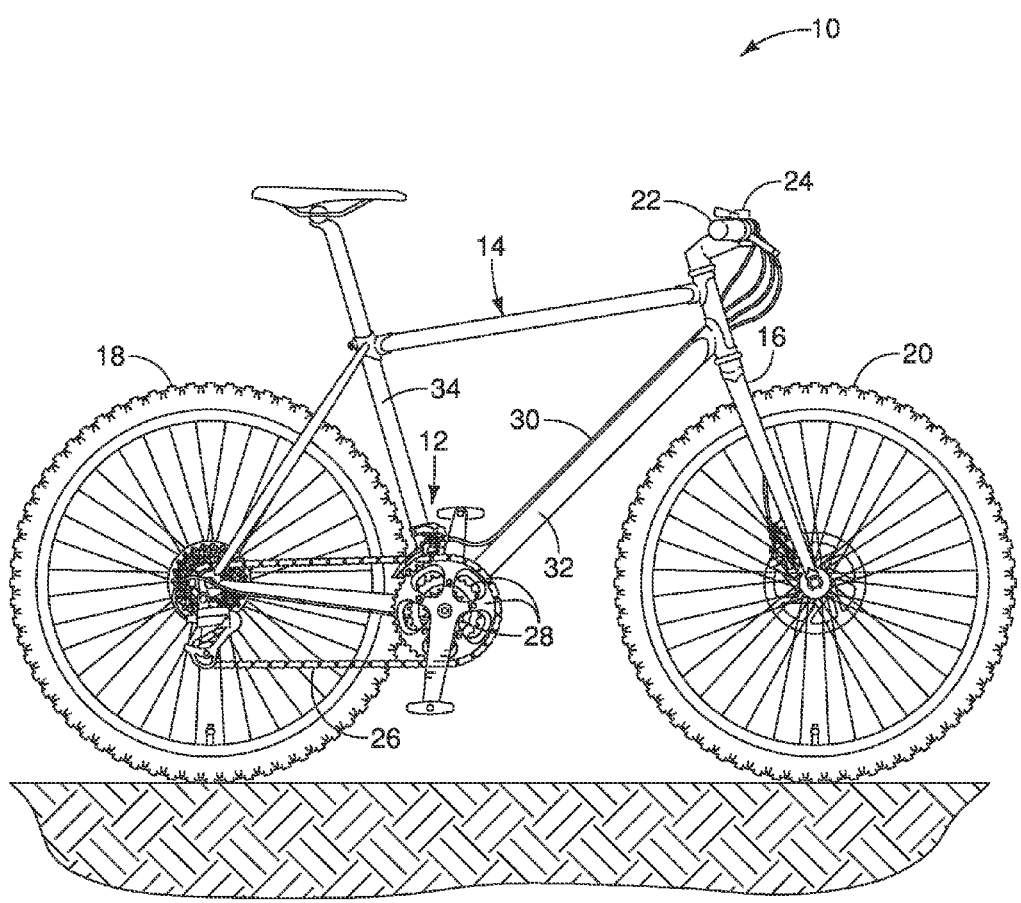
FIG. 1 is a partial side elevational view of a bicycle frame with a front bicycle derailleur mounted thereto in accordance with a first illustrated embodiment.

Referring initially to FIG. 1, a bicycle 10 is illustrated that is equipped with a front bicycle derailleur 12 (herein after referred to as the front derailleur 12) in accordance with a first embodiment. As explained below, the front derailleur 12 is attachable to the bicycle 10 in detachable and reinstallable manner. Basically, the bicycle 10 includes a bicycle frame 14, a front fork 16, a rear wheel 18, a front wheel 2.0 and a handlebar 22. The handlebar 22 is attached to a steerer tube or steering column of the front fork 16. In the illustrated embodiment, a shifter 24 is attached to the handlebar 22 for operating the front derailleur 12 to laterally shift a chain 26 between three front sprockets or chain rings 28. The shifter 24 is operatively connected to the front derailleur 12 by an operation cable 30. It will be apparent to those skilled in the bicycle field from this disclosure that any shifter can be used that uses an operation cable, such as the operation cable 30, to operate the front derailleur 12. Here, the shifter 24 is illustrated on the right side of the handlebar 22. However, the shifter 24 can be provided on either the left or right side of the handlebar 22 for operating the front derailleur 12 as need and/or desired.

Figure 2:
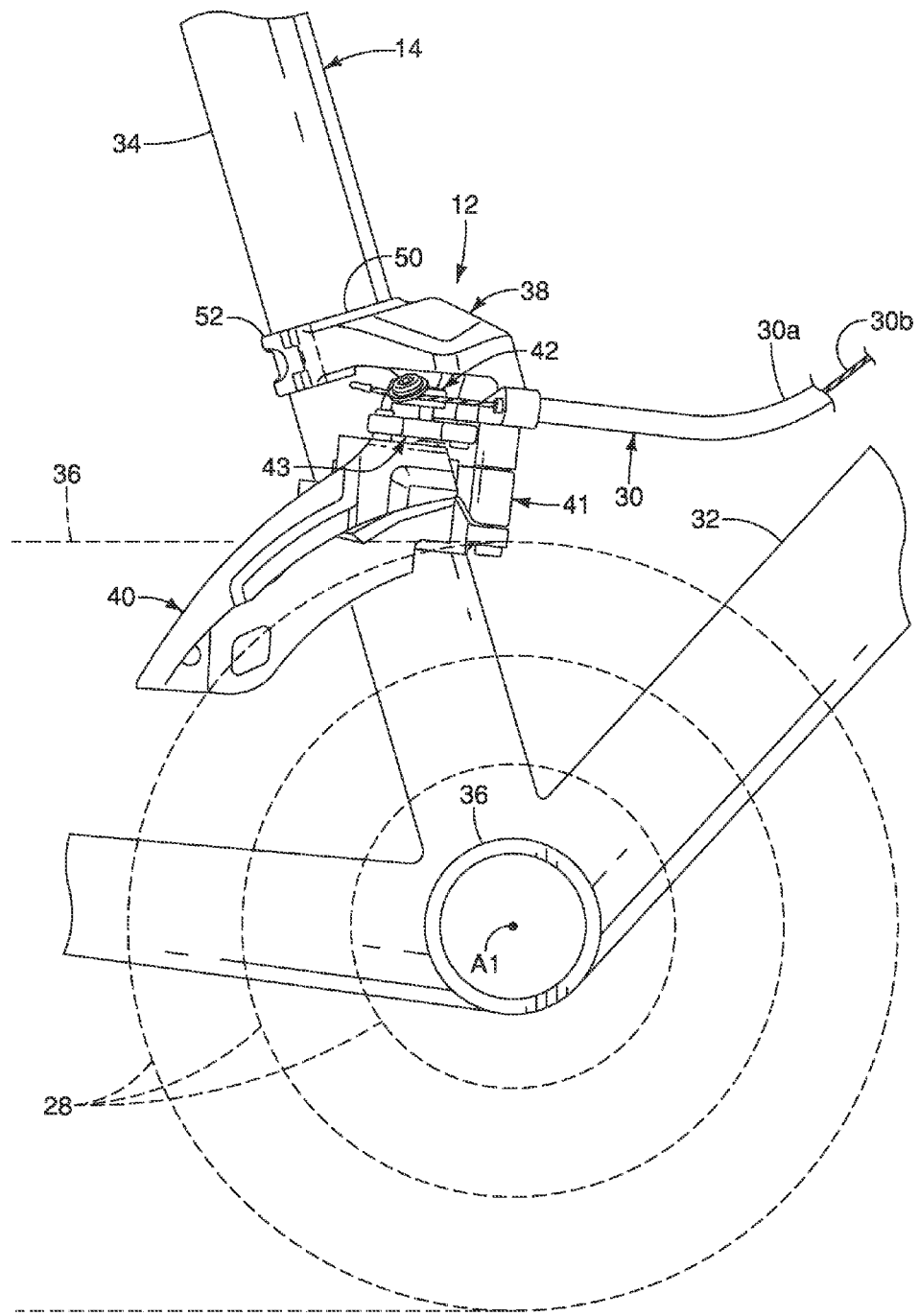
FIG. 2 is an enlarged outer side elevational view of a portion of the bicycle in the area of the front derailleur.
Figure 3:
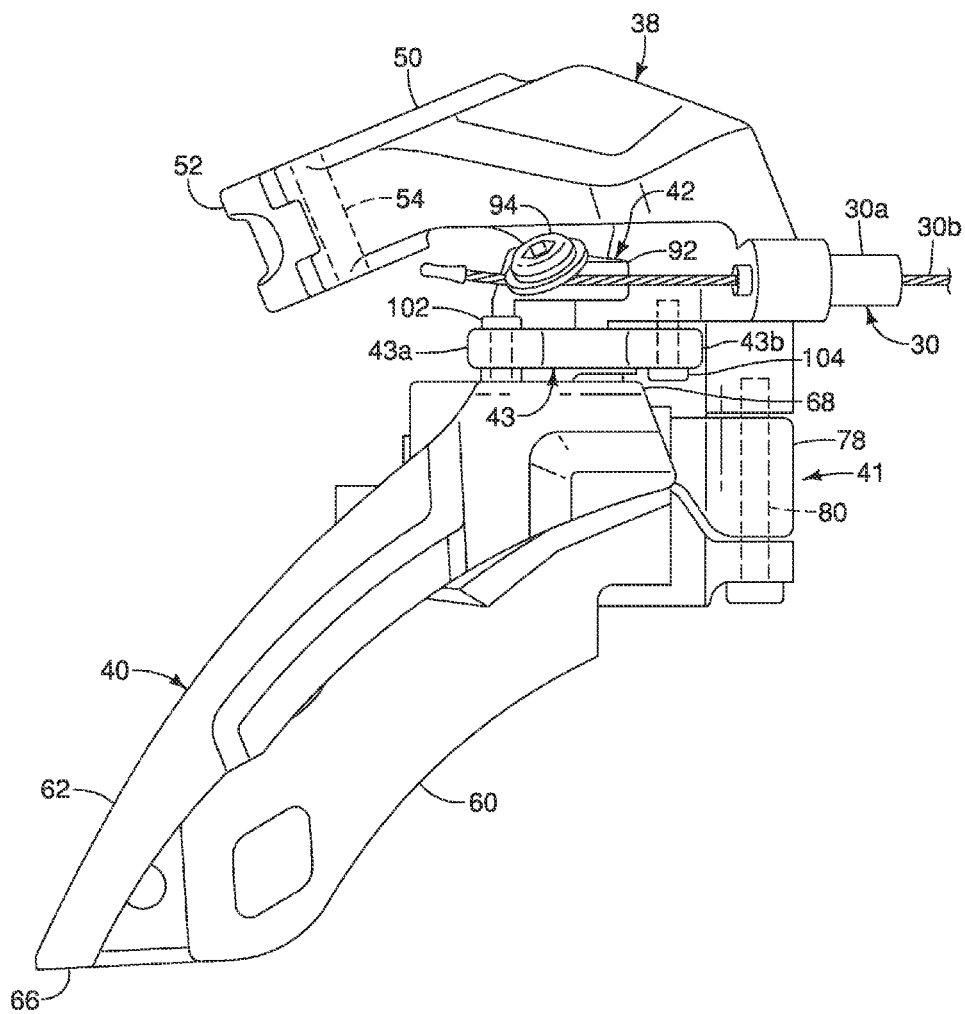
FIG. 3 is a side elevational view of the front derailleur in accordance with the illustrated embodiment, with an operation cable.

Referring to FIGS. 2 and 3, preferably, the operation cable 30 includes an outer casing 30a and an inner cable 30b passing through the outer casing 30a. Thus, in the illustrated embodiment, the operation cable 30 is a conventional Bowden cable. The inner cable 30b is slidably disposed inside the outer casing 30a. In particular, operation of the shifter 24 moves (i.e., pulls or releases) the inner cable 30b inside the outer casing 30a to operate the front derailleur 12. The outer casing 30a can be formed as a single continuous tubular member with one end contacting a part of the shifter 24 and the other ending connecting the front derailleur 12, as illustrated. Alternatively, the outer casing 30a can be formed of two or more pieces as is commonly done on many bicycles. The operation cable 30 is attached to a down tube 32 of the bicycle frame 14 in a conventional manner as seen FIG. 1.

The bicycle 10 can be any type of bicycle and can have a variety of configurations. Since bicycles and their various components are well known in the bicycle field, the following specification does not include detailed descriptions and illustrations regarding the bicycle 10 and its various components other than the front derailleur 12 of the present invention and the components or parts related to the front derailleur 12. In other words, this specification describes and/or illustrates only the front derailleur 12 and the components or parts of the bicycle 10 that is related to the front derailleur 12.

In the illustrated embodiment, as seen in FIGS. 1 and 2, the front derailleur 12 is mounted on a seat tube 34 of the bicycle frame 14. However, it will be apparent to those skilled in the bicycle field from this disclosure that the front derailleur 12 can be attached to a hanger tube 36 of the bicycle frame 14 by a bottom bracket or other mounting structure, if needed and/or desired.

Referring now to FIGS. 3 to 10, the front derailleur 12 will now be described in more detail. The front derailleur 12 comprises a base member 38, a movable member 40, a first link member 41 and a second link member 42. Preferably, the front derailleur 12 further comprises a third link member 43. However, certain aspects of the front derailleur 12 can be attained without including the third link member 43 as will become apparent from the following description of the front derailleur 12. The third link member 43 provides additional stability (i.e., stiffness) to the first and second link members 41 and 42, and more accuracy in positioning the movable member 40.

Figure 9:
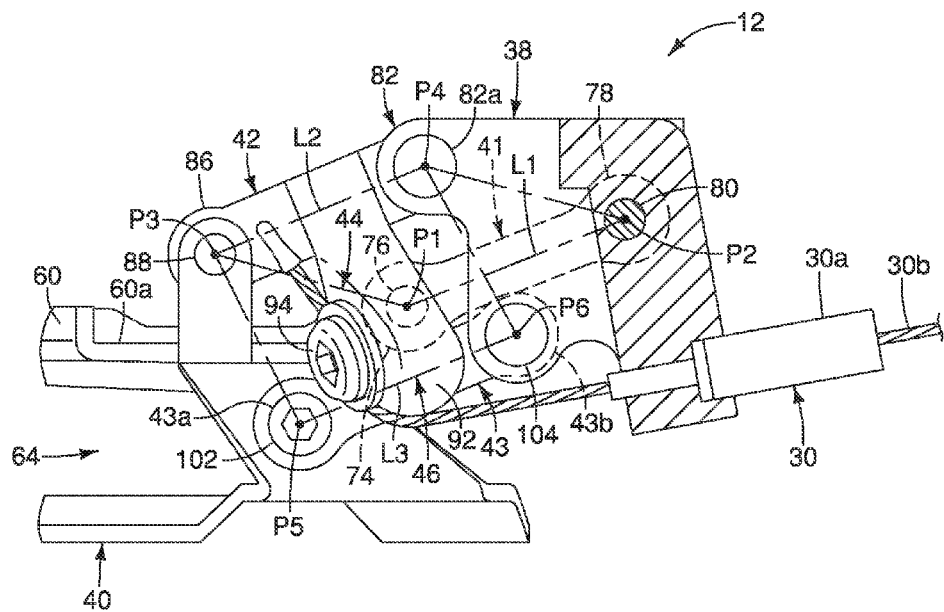
FIG. 9 is a top view of the front derailleur in accordance with the illustrated embodiment.
Figure 10:
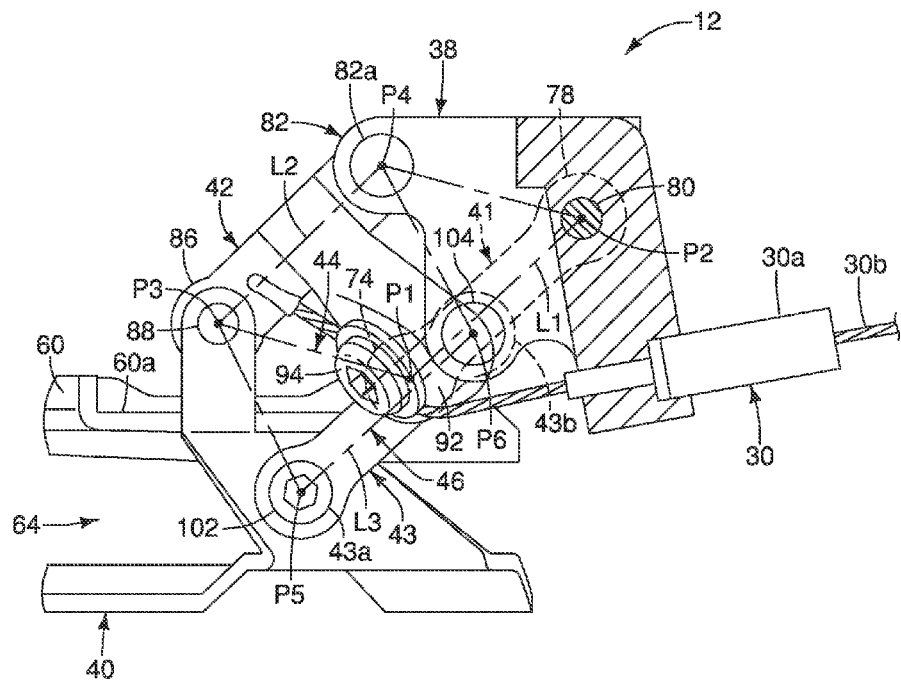
FIG. 10 is a top view of the front derailleur in accordance with the illustrated embodiment.

In the illustrated embodiment, the first, second and third link members 41, 42 43 define a linkage assembly for movably supporting the movable member 40 with respect to the base member 38 between a retracted position (see FIG. 8), an intermediate or middle position (see FIG. 9) and an extended position (see FIG. 10). The first link member 41 is pivotally coupled to die movable member 40 about a first pivot axis P1. The first link member 41 is pivotally coupled to the base member 38 about a second pivot axis P2. The second link member 42 is pivotally coupled to the movable member 40 about a third pivot axis P3. The second link member 42 is pivotally coupled to the base member 38 about a fourth pivot axis P4. The third link member 43 is pivotally coupled to the movable member 40 about a fifth pivot axis P5, The third link member 43 is pivotally coupled to the base member 38 about a sixth pivot axis P6.

Figure 8:
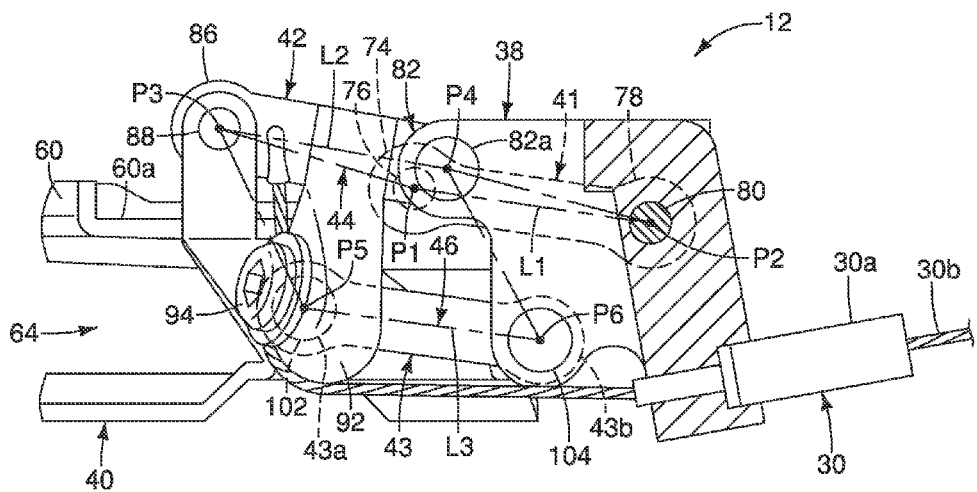
FIG. 8 is a top view of the front derailleur in accordance with the illustrated embodiment.

With this arrangement, as seen in FIGS. 8 to 10, a first four bar linkage 44 defined by the pivot axes P1, P2, P3 and P4, while a second four bar linkage 46 defined by the pivot axes P3, P4, P5 and P6. The first, second, third and fourth pivot axes P1, P2, P3 and P4 are configured to be arranged relative to the base member 38 such that the first and third pivot axes P1 and P3 in the retracted position (see FIG. 8) are offset from the first and third pivot axes P1 and P3 in the extended position (see FIG. 10) in a forward and rear direction with respect to the bicycle 10. In other words, the first and third pivot axes P1 and P3 moves in a forward direction with respect to the bicycle 10 as the movable member 40 moves from the retracted position (see FIG. 8) towards the extended position (see FIG. 10). Further, the first and third pivot axes P1 and P3 moves in a rearward direction with respect to the bicycle 10 as the movable member 40 moves from the extended position (see FIG. 10) towards the retracted position (see FIG. 8).

The base member 38 is configured to be attached to the bicycle 10. In particular, in the illustrated embodiment, the base member 38 is a rigid member that is clamped to the seat tube 34 of the bicycle 10. In the illustrated embodiment, the base member 38 is disposed above the movable member 40 while the front derailleur 12 is in the installed position on the seat tube 34. Of course, it will be apparent to those skilled in the bicycle field from this disclosure that the base member 38 can have other configurations as needed and/or desired. For example, the base member 38 could be attached to the hanger tube 36 by the bottom bracket or a chain stay if needed and/or desired. Typically, the base member 38 is made of a metal material or a fiber reinforced material.

Figure 4:
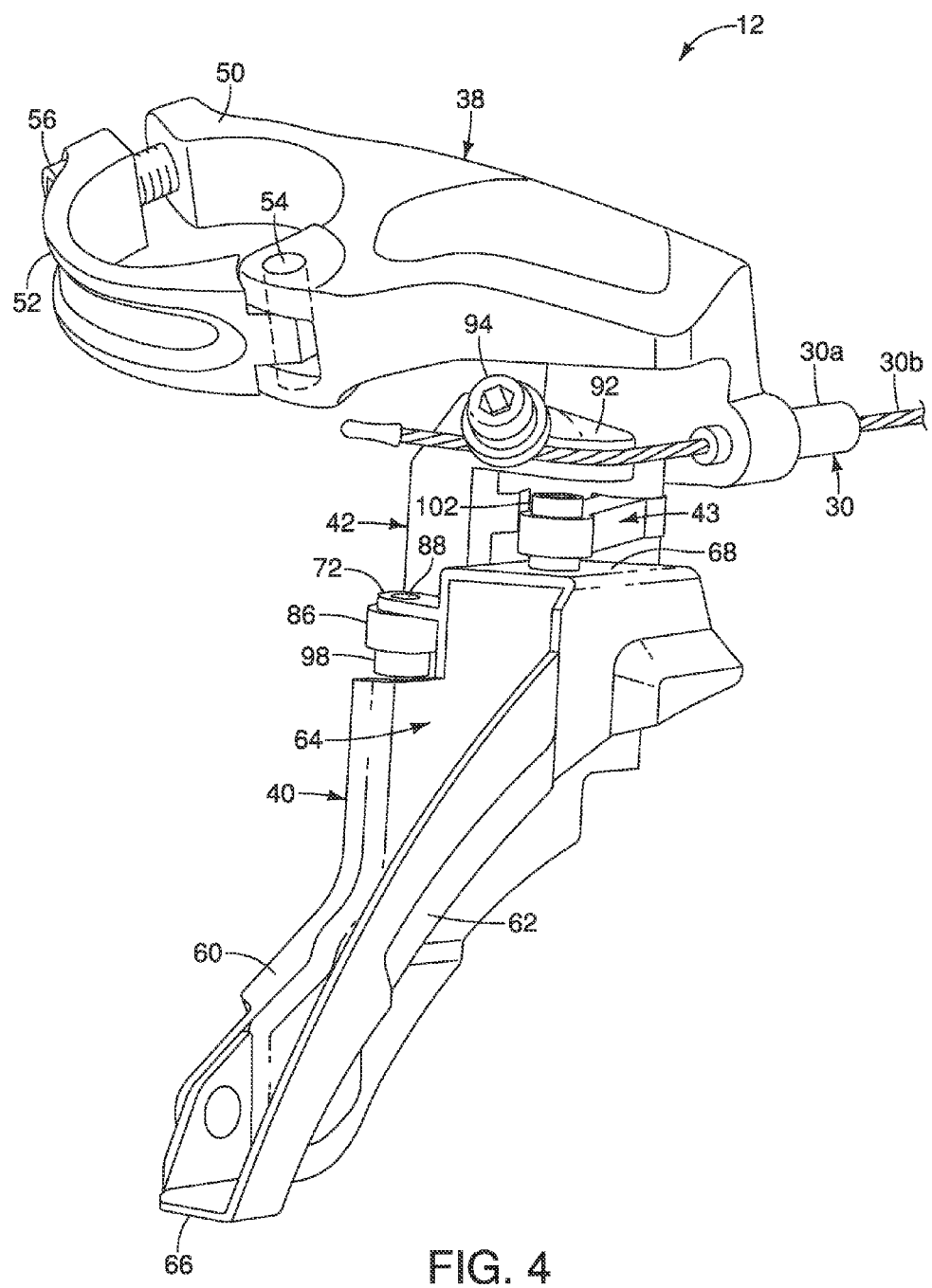
FIG. 4 is a rear perspective view of the front derailleur in accordance with the illustrated embodiment, with the operation cable.
Figure 5:
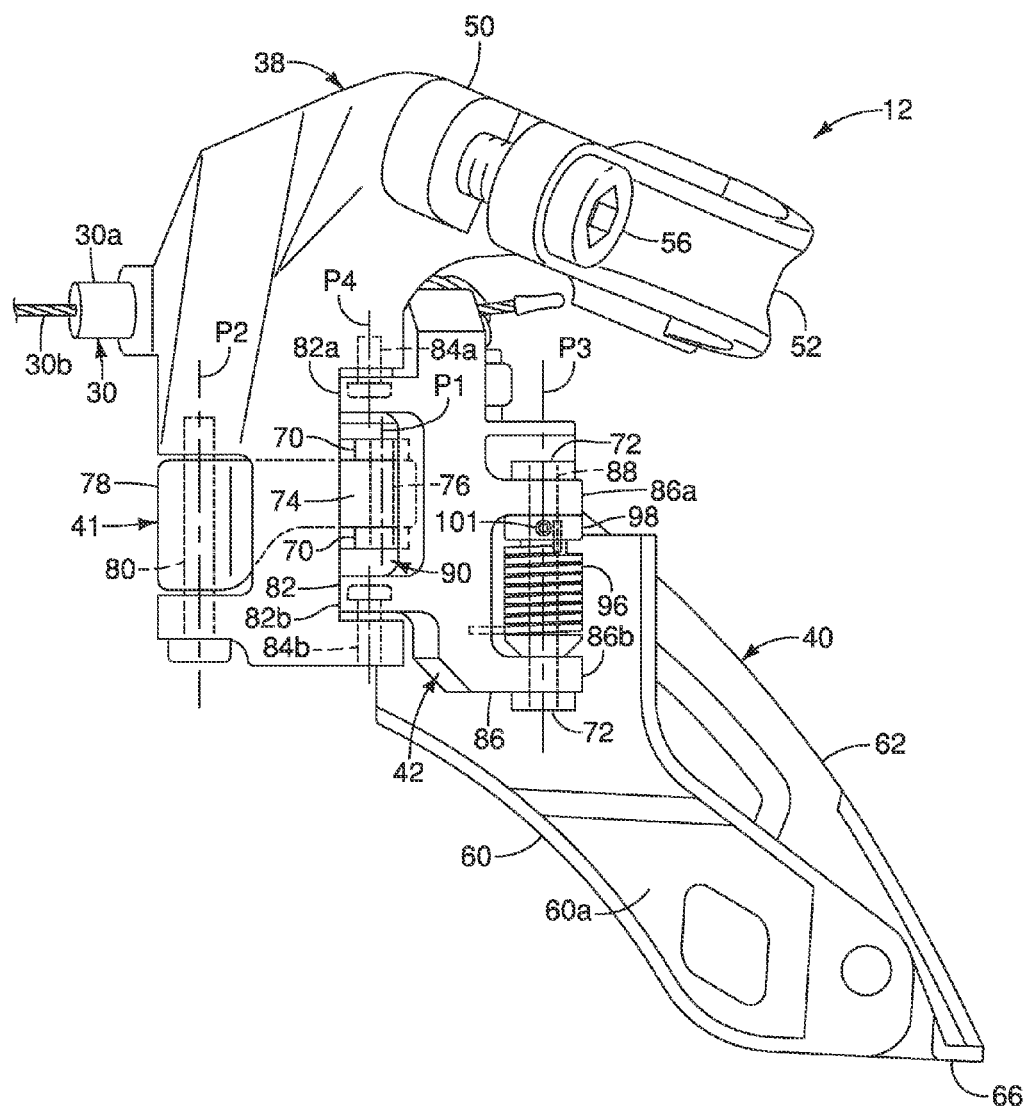
FIG. 5 is an inner side elevational view of the front derailleur in accordance with the illustrated embodiment.

As seen in FIGS. 4 and 5, in the illustrated embodiment, the base member 38 is a hinge type band clamp that includes a first band clamp portion 50 and a second band clamp portion 52. A hinge pin 54 hingedly connects first ends of the first and second band clamp portions 50 and 52 together, while second ends of the first and second band clamp portions 50 and 52 are fastened together by a fastener 56. Here, the fastener 56 includes a bolt and a nut that are used to draw the second ends of the first and second band clamp portions 50 and 52 together for clamping onto the seat tube 34 of the bicycle frame 14 (FIG. 2) in a detachable and reinstallable manner. Typically, the first and second band clamp portions 50 and 52 of the base member 38 are made of a metal material or a fiber reinforced material.

Figure 6:
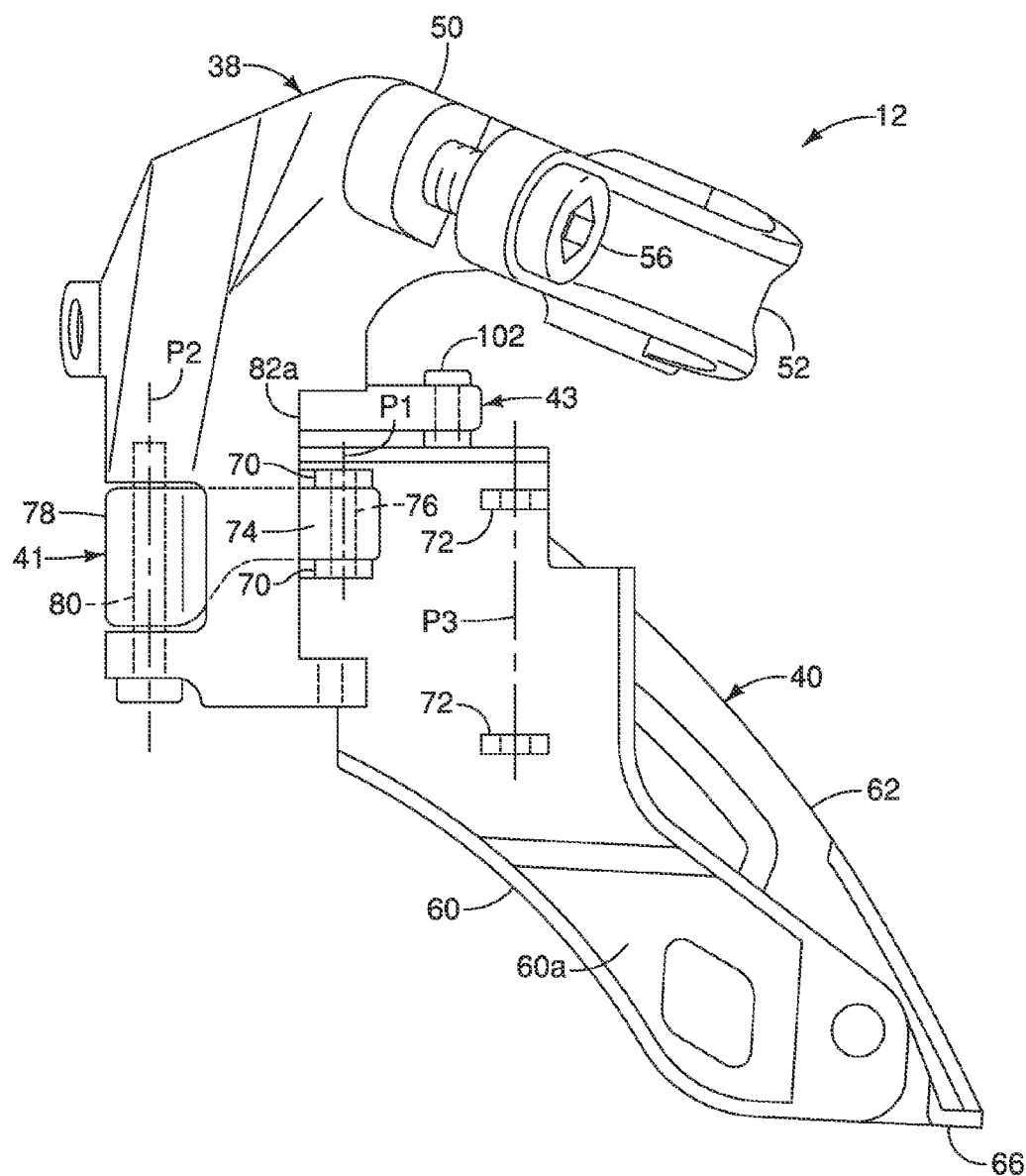
FIG. 6 is an inner side elevational view, similar to FIG. 5, of the front derailleur in accordance with the illustrated embodiment, with the second link member removed.
Figure 7:
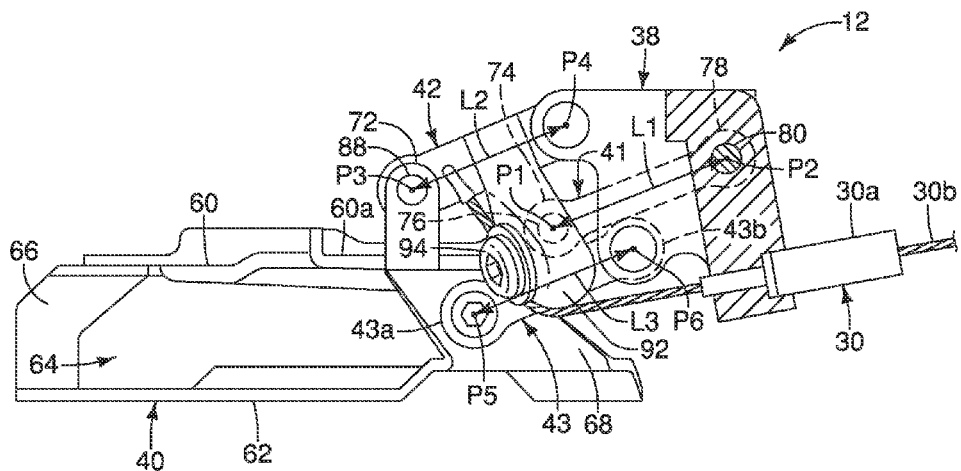
FIG. 7 is a top view of the front derailleur in accordance with the illustrated embodiment.

As shown in FIGS. 3 to 7, the movable member 40 includes an inner plate 60 and an outer plate 62. The inner plate 60 and the outer plate 62 are configured to form a chain guiding slot 64 therebetween. In the illustrated embodiment, the movable member 40 further includes an upstream connecting part 66 and a downstream connecting part 68. The upstream connecting part 66 connects upstream ends of the inner and outer plates 60 and 62. The downstream connecting part 68 connects downstream ends of the inner and outer plates 60 and 62. The terms "upstream" and "downstream" as used herein mean with respect to the movement of the chain 26 inside the chain guiding slot 64 during pedaling. In other words, the inner surfaces of the inner and outer plates 60 and 62 face each other to form the chain guiding slot 64 therebetween for receiving the chain 26. As best seen in FIGS. 5 and 6, the inner plate 60 has a pair of mounting flanges 70 for pivotally mounting the first link member 41. The inner plate 60 also has a pair of mounting flanges 72 for pivotally mounting the second link member 42. The mounting flanges 70 and 72 are formed on an outer surface 60a (i.e., the frame facing side in the illustrated embodiment) of the inner plate 60 that faces the bicycle 10 and opposite to the chain guiding slot 64. Thus, the first and second link members 41 and 42 are pivotally mounted to the movable member 40 on the outer surface 60a of the inner plate 60. The third link member 43 is pivotally attached to the downstream connecting part 68.

Referring to FIGS. 8 and 10, the movable member 40 is configured to be movable with respect to the base member 38 between a retracted position (see FIG. 8) and an extended position (see FIG. 10) at which the movable member 40 is farther from the base member 38 than the retracted position. In particular, with the arrangement of the first and second link members 41 and 42, the movement of movable member 40 is in a generally horizontal plane such that the movable member 40 swings a forward and rear direction with respect to the bicycle 10 as the movable member 40 swings laterally with respect to the bicycle 10 between the retracted position (see FIG. 8) and the extended position (see FIG. 10). In the illustrated embodiment, the movable member 40 of the front derailleur 12 includes a middle or intermediate position (see FIG. 9).

More specifically, the movable member 40 is moved relative to the base member 38 in an outward direction away from the bicycle frame 14 by pulling the inner cable 30b (i.e., a pulling operation) of the operation cable 30 in response to actuation of the shifter 24. Thus, in response to the pulling operation of the operation cable 30, the inner plate 60 contacts and laterally shifts the bicycle chain 26 such that the bicycle chain 26 moves in an outward direction with respect to the bicycle frame 14 between the chain rings 28. Also the movable member 40 is moved relative to the base member 38 in an inward direction towards the bicycle frame 14 by releasing the inner cable 30b (i.e., a releasing operation) of the operation cable 30 in response to actuation of the shifter 24. Thus, in response to releasing operation of the operation cable 30, the outer plate 62 contacts and laterally shifts the bicycle chain 26 such that the bicycle chain 26 moves in an inward direction with respect to the bicycle frame 14 between the chain rings 28. In this way, the movable member 40 is selectively positions the bicycle chain 26 over one of the chain rings 28 in response to the actuation of the shifter 24.

Now, the first link member 41 will be discussed in more detail. The first link member 41 is a rigid member that is made of a suitable material such as a metal material or a fiber reinforced material. Here in the illustrated embodiment, the first link member 41 is an outer link which is disposed farther from the bicycle frame 14 than the second link member 42 while the front derailleur 12 in the installed position. The first link member 41 has an effective length L1. The effective length L1 of the first link member 41 is measured between the first and second pivot axes P1 and P2. The first link member 41 includes a first connecting portion 74 that is pivotally coupled to the movable member 40 about the first pivot axis P1. Specifically, the first connecting portion 74 is attached to the movable member 40 by a pivot pin 76. The first link member 41 further includes a connecting portion 78 that is pivotally coupled to the base member 38 about the second pivot axis P2. Specifically, the connecting portion 78 is attached to the base member 38 by a pivot pin 80.

Now, the second link member 42 will be discussed in more detail. The second link member 42 is a rigid member that is made of a suitable material such as a metal material or a fiber reinforced material. Here in the illustrated embodiment, the second link member 42 is an inner link. The second link member 42 has an effective length L2. The effective length L2 of the second link member 42 is measured between the third and fourth pivot axes P3 and P4. The effective length L2 of the second link member 42 is equal to the effective length L1 of the first link member 41.

One end of the second link member 42 is pivotally coupled to the movable member 40 about the third pivot axis P3, while the other end of the second link member 42 is pivotally coupled to the base member 38 about the fourth pivot axis P4. The second link member 42 further includes a second connecting portion 82 that pivotally couples to the base member 38 about the fourth pivot axis P4. Specifically, the second connecting portion 82 includes a first connecting part 82a that is attached to the base member 38 and a second connecting part 82b that is attached to the base member 38. Specifically, the first connecting part 82a is attached to the base member 38 by a first pivot shaft 84a. Similarly, the second connecting part 82b is attached to the base member 38 by a second pivot shaft 84b. The first and second connecting parts 82a and 82b are aligned in an axial direction of the fourth pivot axis P4. The second link member 42 includes a third connecting portion 86 that is pivotally coupled to the movable member 40 about the third pivot axis P3.

Specifically, the third connecting portion 86 is attached to the movable member 40 by a pivot pin 88. Specifically, the third connecting portion 86 includes a first connecting part 86a that is attached to the movable member 40 by the pivot pin 88 and a second connecting part 86b that is attached to the movable member 40 by the pivot pin 88. The first and second connecting parts 86a and 86b are aligned in an axial direction of the third pivot axis P3. The first connecting portion 74 of the first link member 41 and the third connecting portion 86 of the second link member 42 are disposed between the base member 38 and the outer surface 60a of the inner plate 60. With this arrangement of the first connecting portion 74 and the third connecting portion 86 being located between the base member 38 and the outer surface 60a, a more compact front derailleur can be made as compared to a conventional derailleur. Also the first and second link members 41 and 42 can be shorter than in a conventional front derailleur while still providing sufficient movement of the stroke of the movable member 40 between the retracted position and the extended position.

With this arrangement of the first and second link members 41 and 42, as seen in FIG. 5, the second link member 42 includes a space 90 that receives the first connecting portion 74 of the first link member 41. Specifically, the space 90 is located between the first and second connecting parts 82a and 82b. The first connecting portion 74 of the first link member 41 is disposed between the first connecting part 82a and the second connecting part 82b as viewed in a direction perpendicular to the first pivot axis P1.

Preferably, with this arrangement of the first and second link members 41 and 42, the first connecting portion 74 of the first link member 41 at least partially overlapping with the second connecting portion 82 of the second link member 42 as viewed in the direction parallel to the first pivot axis P1 in the state in which the movable member 40 is disposed at one of the retracted position and the extended position. With this overlapping arrangement of the first and second link members 41 and 42, a more compact front derailleur can be made as compared to a conventional derailleur. Also the first and second link members 41 and 42 can be shorter than in a conventional front derailleur while still providing sufficient movement of the stroke of the movable member 40 between the retracted position and the extended position.

The third link member 43 is not needed to obtain the compact structure provided by using the overlapping arrangement of the first and second link members 41 and 42. However, as previously mentioned, the third link member 43 provides additional stability (i.e., stiffness) to the first and second link members 41 and 42, and more accuracy in positioning the movable member 40. Similarly, the overlapping arrangement of the first and second link members 41 and 42 is not needed to obtain the additional stability that is provided by the third link member 43.

Here in the illustrated embodiment, as seen in FIG. 8, the first connecting portion 74 of the first link member 41 is located in the space 90 between the first and second connecting parts 82a and 82b while the movable member 40 is in the retracted position. Thus, in the illustrated embodiment, the first connecting portion 74 of the first link member 41 at least partially overlaps with the second link member 42 while the movable member 40 is disposed at the retracted position as seen in FIG. 8. Of course, it will be apparent from this disclosure that the first and second link members 41 and 42 could be reconfigured and rearranged such that the first connecting portion 74 of the first link member 41 is located in the space 90 between the first and second connecting parts 82a and 82b while the movable member 40 is in the extended position. In the illustrated embodiment, as seen in FIG. 8, the first connecting portion 74 of the first link member 41 protrudes toward the second link member 42.

In the illustrated embodiment, as seen in FIGS. 8 to 10, the second link member 42 includes a support projection 92 and a cable attachment structure 94. The support projection 92 extends outwardly from an intermediate portion of the second link member 42. The cable attachment structure 94 is disposed on the support projection 92 at a location adjacent the third link member 43. The inner cable 30b is attached to the second link member 42 by the cable attachment structure 94. Specifically, the cable attachment structure 94 is basically a bolt that is screwed into a threaded bore of the support projection 92 of the second link member 42. When the second link member 42 is pulled or released by movement of the inner cable 30b of the operation cable 30, the movable member 40 is moved between the retracted position and the extended position for moving the bicycle chain 26 between the chain rings 28.

In the illustrated embodiment, as seen in FIG. 5, a biasing member 96 is provided between the movable member 40 and the second link member 42. In the illustrated embodiment, the biasing member 96 is operatively arranged between the movable member 40 and the second link member 42 to bias the movable member 40 towards the retracted position. Alternatively, the biasing member 96 could be arranged to bias the movable member 40 towards the extended position, if needed and/or desired. In the illustrated embodiment, the biasing member 96 is a torsion spring. The biasing member 96 has a coiled portion mounted on the pivot pin 88. A first end of the biasing member 96 is engaged with the inner plate 60. For example, as in the illustrated embodiment, the first end of the biasing member 96 is hooked on the inner plate 60. A second end of the biasing member 96 is fixed to an adjustment collar 98 that is fixed to the second link member 42 via the pivot pin 88. The pivot pin 88 is non-rotatably mounted to the second link member 42. The adjustment collar 98 has a set screw 101 that engages the pivot pin 88 for fixing the adjustment collar 98 to the pivot pin 88. By fixing the adjustment collar 98 with the set screw 101 at different angular positions the biasing force of the biasing member 96 on the movable member 40 can be varied.

Now, the third link member 43 will be discussed in more detail. The third link member 43 is a rigid member that is made of a suitable material such as a metal material or a fiber reinforced material. The third link member 43 is disposed farther from the second link member 42 than the first link member 41. The third link member 43 has an effective length L3 that is equal to the effective length L2 of the second link member 42.

The effective length L3 of the third link member 43 is measured between the fifth and sixth pivot axes P5 and P6. The third link member 43 provides additional stability (i.e., stiffness) to the first and second link members 41 and 42, and more accuracy in positioning the movable member 40. The third link member 43 includes a connecting portion 43a that is pivotally coupled to the movable member 40 about the fifth pivot axis P5. Specifically, the first connecting portion 43a is attached to the movable member 40 by a pivot pin 102 at a location of downstream connecting part 68. The third link member 43 further includes a connecting portion 43b that is pivotally coupled to the base member 38 about the sixth pivot axis P6. Specifically, the connecting portion 43b is attached to the base member 38 by a pivot pin 104.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

As used herein, the following directional terms "frame facing side", "non-frame facing side", "forward", "rearward", "front", "rear", "up", "down", "above", "below", "upward", "downward", "top", "bottom", "side", "vertical", "horizontal", "perpendicular" and "transverse" as well as any other similar directional terms refer to those directions of a bicycle in an upright, riding position and equipped with the bicycle derailleur. Accordingly, these directional terms, as utilized to describe the bicycle derailleur should be interpreted relative to a bicycle in an upright riding position on a horizontal surface and that is equipped with the bicycle derailleur. The terms "left" and "right" are used to indicate the "right" when referencing from the right side as viewed from the rear of the bicycle, and the "left" when referencing from the left side as viewed from the rear of the bicycle.

Also it will be understood that although the terms "first" and "second" may be used herein to describe various components these components should not be limited by these terms. These terms are only used to distinguish one component from another. Thus, for example, a first component discussed above could be termed a second component and vice-a-versa without departing from the teachings of the present invention. The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, while the illustrated embodiment is a front derailleur, it will be apparent to those skilled in the art from this disclosure that the above explained configuration can be applied to a rear derailleur. Also while the illustrated embodiment is a front derailleur that swings in a forward-rearward direction, the various features of the present invention as described above can be applied to top swing and down swing front derailleurs. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:
1. A bicycle derailleur comprising:
a base member configured to be attached to a bicycle;
a movable member configured to be movable with respect to the base member between a retracted position and an extended position at which the movable member is farther from the base member than the retracted position;
a first link member including a first connecting portion pivotally coupled to the movable member about a first pivot axis, the first link member being pivotally coupled to the base member about a second pivot axis; and
a second link member pivotally coupled to the movable member about a third pivot axis, the second link member being pivotally coupled to the base member about a fourth pivot axis,
the first connecting portion at least partially overlapping with a part of the second link member extending between the third pivot axis and the fourth pivot axis, as viewed in a direction parallel to the first pivot axis in a state in which the movable member is disposed at one of the retracted position and the extended position.

2. The bicycle derailleur according to claim 1, wherein the first, second, third and fourth pivot axes are configured to be arranged relative to the base member such that the first and third pivot axes in the retracted position are offset from the first and third pivot axes in the extended position in a forward and rear direction with respect to a bicycle.

3. The bicycle derailleur according to claim 1, wherein the first link member is an outer link and the second link member is an inner link.

4. The bicycle derailleur according to claim 3, wherein the second link member includes a support projection extending outwardly and a cable attachment structure being disposed on the support projection adjacent the first link member.

5. A bicycle derailleur comprising:
a base member configured to be attached to a bicycle;
a movable member configured to be movable with respect to the base member between a retracted position and an extended position at which the movable member is farther from the base member than the retracted position;
a first link member including a first connecting portion pivotally coupled to the movable member about a first pivot axis first link member being pivotally coupled to the base member about a second pivot axis; and
a second link member pivotally coupled to the movable member about a third pivot axis, the second link member being pivotally coupled to the base member about a fourth pivot axis, the second link member including a second connecting portion that pivotally couples to the base member about the fourth pivot axis,
the first connecting portion at least partially overlapping with the second link member as viewed in a direction parallel to the first pivot axis in a state in which the movable member is disposed at one of the retracted position and the extended position, and the first connecting portion at least partially overlapping with the second connecting portion as viewed in the direction parallel to the first pivot axis in the state in which the movable member is disposed at one of the retracted position and the extended position.

6. The bicycle derailleur according to claim 1, wherein the second link member includes a space that receives the first connecting portion of the first link member.

7. The bicycle derailleur according to claim 5, wherein the second link member includes a space that receives the first connecting portion of the first link member.

8. The bicycle derailleur according to claim 7, wherein the second connecting portion includes a first connecting part attached to the base member and a second connecting part attached to the base member, the space being located between the first and second connecting parts.

9. The bicycle derailleur according to claim 8, wherein the first connecting part is attached to the base member by a first pivot shaft, and the second connecting part is attached to the base member by a second pivot shaft.

10. The bicycle derailleur according to claim 5, wherein the second connecting portion includes a first connecting part attached to the base member and a second connecting part attached to the base member, and the first connecting portion is disposed between the first connecting part and the second connecting part as viewed in a direction perpendicular to the first pivot axis.

11. The bicycle derailleur according to claim 1, wherein the first connecting portion protrudes toward the second link member.

12. A bicycle derailleur comprising:
a base member configured to be attached to a bicycle;
a movable member configured to be movable with respect to the base member between a retracted position and an extended position at which the movable member is farther from the base member than the retracted position;
a first link member including a first connecting portion pivotally coupled to the movable member about a first pivot axis, the first link member being pivotally coupled to the base member about a second pivot axis;
a second link member pivotally coupled to the movable member about a third pivot axis, the second link member being pivotally coupled to the base member about a fourth pivot axis; and
a third link member pivotally coupled to the movable member about a fifth pivot axis, the third link member being pivotally coupled to the base member about a sixth pivot axis,
the first connecting portion at least partially overlapping with the second link member as viewed in a direction parallel to the first pivot axis in a state in which the movable member is disposed at one of the retracted position and the extended position.

13. The bicycle derailleur according to claim 12, wherein the third link member is disposed farther from the second link member than the first link member.

14. The bicycle derailleur according to claim 13, wherein the third link member has an effective length that is equal to an effective length of the second link member, the effective length of the third link member is measured between the fifth and sixth pivot axes, while the effective length of the second link member is measured between the third and fourth pivot axes.

15. The bicycle derailleur according to claim 13, wherein the second link member includes a support projection extending outwardly and a cable attachment structure being disposed on the support projection adjacent the third link member.

16. A bicycle derailleur comprising:
a base member configured to be attached to a bicycle;
a movable member including an inner plate and an outer plate configured to form a chain guiding slot therebetween, the movable member being configured to be movable with respect to the base member between a retracted position and an extended position at which the movable member is farther from the base member than the retracted position;
a first link member including a first connecting portion pivotally coupled to the movable member about a first pivot axis, the first link member being pivotally coupled to the base member about a second pivot axis; and a second link member including a third connecting portion pivotally coupled to the movable member about a third pivot axis, the second link member being pivotally coupled to the base member about a fourth pivot axis, the first pivot axis and the third pivot axis being disposed between the base member and an outer surface of the inner plate, the outer surface of the inner plate facing a direction away from the outer plate, and the first pivot axis and the third pivot axis being disposed offset from the outer surface of the inner plate in the direction away from the outer plate.

17. The bicycle derailleur according to claim 16, wherein the first, second, third and fourth pivot axes are configured to be arranged relative to the base member such that the first and third pivot axes in the retracted position are offset from the first and third pivot axes in the extended position in a forward and rear direction with respect to a bicycle.

18. A bicycle derailleur comprising:
a base member configured to be attached to a bicycle;
a movable member configured to be movable with respect to the base member between a retracted position and an extended position at which the movable member is farther from the base member than the retracted position;
a first link member including a first connecting portion pivotally coupled to the movable member about a first pivot axis, the first link member being pivotally coupled to the base member about a second pivot axis;
a second link member pivotally coupled to the movable member about a third pivot axis, the second link member being pivotally coupled to the base member about a fourth pivot axis; and
a third link member pivotally coupled to the movable member about a fifth pivot axis and pivotally coupled to the base member about a sixth pivot axis.

* * * * *